US010288361B2

(12) United States Patent
Wenzel

(10) Patent No.: US 10,288,361 B2
(45) Date of Patent: May 14, 2019

(54) HOT AND COLD SHELF ASSEMBLY WITH REPLACEABLE HEATING ELEMENTS

(71) Applicant: Hatco Corporation, Milwaukee, WI (US)

(72) Inventor: Gerhard Wenzel, Sussex, WI (US)

(73) Assignee: Hatco Corporation, Milwaukee, WI (US)

( * ) Notice: Subject to any disclaimer, the term of this patent is extended or adjusted under 35 U.S.C. 154(b) by 532 days.

(21) Appl. No.: 14/660,654

(22) Filed: Mar. 17, 2015

(65) Prior Publication Data

US 2016/0273843 A1   Sep. 22, 2016

(51) Int. Cl.
| | | |
|---|---|---|
| F28F 3/12 | (2006.01) |
| A47J 39/02 | (2006.01) |
| F28F 3/00 | (2006.01) |
| F28D 7/00 | (2006.01) |
| F28D 7/08 | (2006.01) |
| F28F 1/22 | (2006.01) |
| H05B 3/68 | (2006.01) |
| F28D 21/00 | (2006.01) |
| A47F 3/04 | (2006.01) |

(52) U.S. Cl.
CPC .............. *F28F 3/12* (2013.01); *A47J 39/02* (2013.01); *F28D 7/0066* (2013.01); *F28D 7/082* (2013.01); *F28F 1/22* (2013.01); *F28F 3/005* (2013.01); *H05B 3/686* (2013.01); *A47F 3/0482* (2013.01); *F28D 2021/0042* (2013.01); *F28D 2021/0077* (2013.01); *F28F 2270/00* (2013.01); *F28F 2280/00* (2013.01)

(58) Field of Classification Search
CPC ....... A47J 39/02; A47F 3/0491; A47F 3/0482; F28D 7/082; F28D 2021/0042; F28D 2021/0077; F28D 7/0066; F28F 2280/00; F28F 2270/00; F28F 1/22; F28F 3/12; F28F 3/005
USPC ........................................................ 165/48.1
See application file for complete search history.

(56) References Cited

U.S. PATENT DOCUMENTS

| | | | | |
|---|---|---|---|---|
| 3,648,477 A | * | 3/1972 | Shartle | F25D 31/006 165/169 |
| 4,306,616 A | * | 12/1981 | Woods, Jr. | A47F 3/0491 165/136 |
| 5,363,672 A | | 11/1994 | Moore et al. | |
| 5,598,886 A | | 2/1997 | Criado-Mellado | |
| 5,835,334 A | * | 11/1998 | McMillin | H01L 21/6833 279/128 |
| 5,941,077 A | | 8/1999 | Safyan | |

(Continued)

*Primary Examiner* — Devon Russell
(74) *Attorney, Agent, or Firm* — Foley & Lardner LLP

(57) ABSTRACT

A heating and cooling unit includes a panel, a heating assembly configured to heat the panel as part of a heating operation, and a cooling assembly configured to cool the panel as part of a cooling operation. The heating assembly includes a first plate disposed along a first side of the panel, the first plate having a body that defines a slot. The heating assembly further includes a heating element disposed within the slot. The cooling assembly includes a second plate coupled to the first plate and a cooling element coupled to the second plate. The panel, the heating assembly, and the cooling assembly are arranged in a stacked configuration with the heating assembly between the panel and the cooling assembly.

20 Claims, 8 Drawing Sheets

(56) References Cited

U.S. PATENT DOCUMENTS

| | | | |
|---|---|---|---|
| 6,536,227 B1* | 3/2003 | Lee | F25B 39/02 165/171 |
| 6,735,958 B2 | 5/2004 | Baumann | |
| 7,266,890 B2* | 9/2007 | Cieslik | F25B 39/02 165/171 |
| 7,554,059 B2* | 6/2009 | Awazu | H05B 3/143 118/50.1 |
| 7,665,311 B2 | 2/2010 | Steffensen et al. | |
| 8,171,845 B2 | 5/2012 | Hartsfield, Jr. et al. | |
| 8,618,448 B2 | 12/2013 | Alexander | |
| 8,663,391 B2* | 3/2014 | Matyushkin | H01L 21/67109 118/724 |
| 2001/0004836 A1* | 6/2001 | Richmond | A47F 3/0439 62/258 |
| 2003/0168439 A1* | 9/2003 | Kanno | H01L 21/6831 219/390 |
| 2004/0139756 A1* | 7/2004 | Wall | G01R 31/2874 62/230 |
| 2006/0005548 A1* | 1/2006 | Ruckstuhl | A47B 77/08 62/3.2 |
| 2008/0029248 A1* | 2/2008 | Magnant | B01L 7/00 165/104.19 |
| 2011/0252813 A1* | 10/2011 | Veltrop | A47J 36/2483 62/3.3 |
| 2011/0277644 A1 | 11/2011 | Frauenfeld et al. | |

* cited by examiner

HOT AND COLD SHELF ASSEMBLY WITH REPLACEABLE HEATING ELEMENTS

BACKGROUND

Food products may need to be maintained at a certain temperature (e.g., before being served to a customer, etc.). For example, many food products need to be maintained in a certain temperature range to provide a desired eating experience or to comply with food safety regulations. Food products are traditionally maintained at a desired temperature using a unit that provides a temperature-controlled environment. The unit may include one or more heating elements. The heating elements may fail after extended use. Failure of the heating elements may require replacement or disassembly of significant portions of traditional units. Traditional units may also include an enclosure (e.g., one or more side walls, one or more mounting brackets, etc.) upon which condensation forms during operation. Condensation may be a nuisance to operators of the unit and may damage underlying equipment and surfaces, among posing other challenges.

SUMMARY

One embodiment relates to a heating and cooling unit. The heating and cooling unit includes a panel, a heating assembly configured to heat the panel as part of a heating operation, and a cooling assembly configured to cool the panel as part of a cooling operation. The heating assembly includes a first plate disposed along a first side of the panel, the first plate having a body that defines a slot. The heating assembly further includes a heating element disposed within the slot. The cooling assembly includes a second plate coupled to the first plate and a cooling element coupled to the second plate. The panel, the heating assembly, and the cooling assembly are arranged in a stacked configuration with the heating assembly between the panel and the cooling assembly.

Another embodiment relates to a heating and cooling unit. The heating and cooling unit includes a panel, a heating assembly coupled to the panel and configured to heat the panel as part of a heating operation, a cooling assembly coupled to the panel and configured to cool the panel as part of a cooling operation, an enclosure coupled to the panel and defining a cavity that receives the heating assembly and the cooling assembly, and a thermal break including a thermally-resistive material positioned to thermally isolate the enclosure from the panel. The panel, the heating assembly, the cooling assembly, and the enclosure are arranged in a stacked configuration with the heating assembly between the panel and the cooling assembly.

Another embodiment relates to a heating and cooling unit. The heating and cooling unit includes a panel, a heating assembly configured to heat the panel as part of a heating operation, a cooling assembly configured to cool the panel as part of a cooling operation, at least one of an enclosure and a bracket coupled to the panel, and a thermal break including a thermally-resistive material positioned to thermally isolate the at least one of the enclosure and the bracket from the panel. The heating assembly includes a first plate having a body that defines a slot and a heating element disposed within the slot and coupled to the first plate. The first plate is disposed along a first side of the panel, and the cooling assembly includes a cooling element coupled to the first plate.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
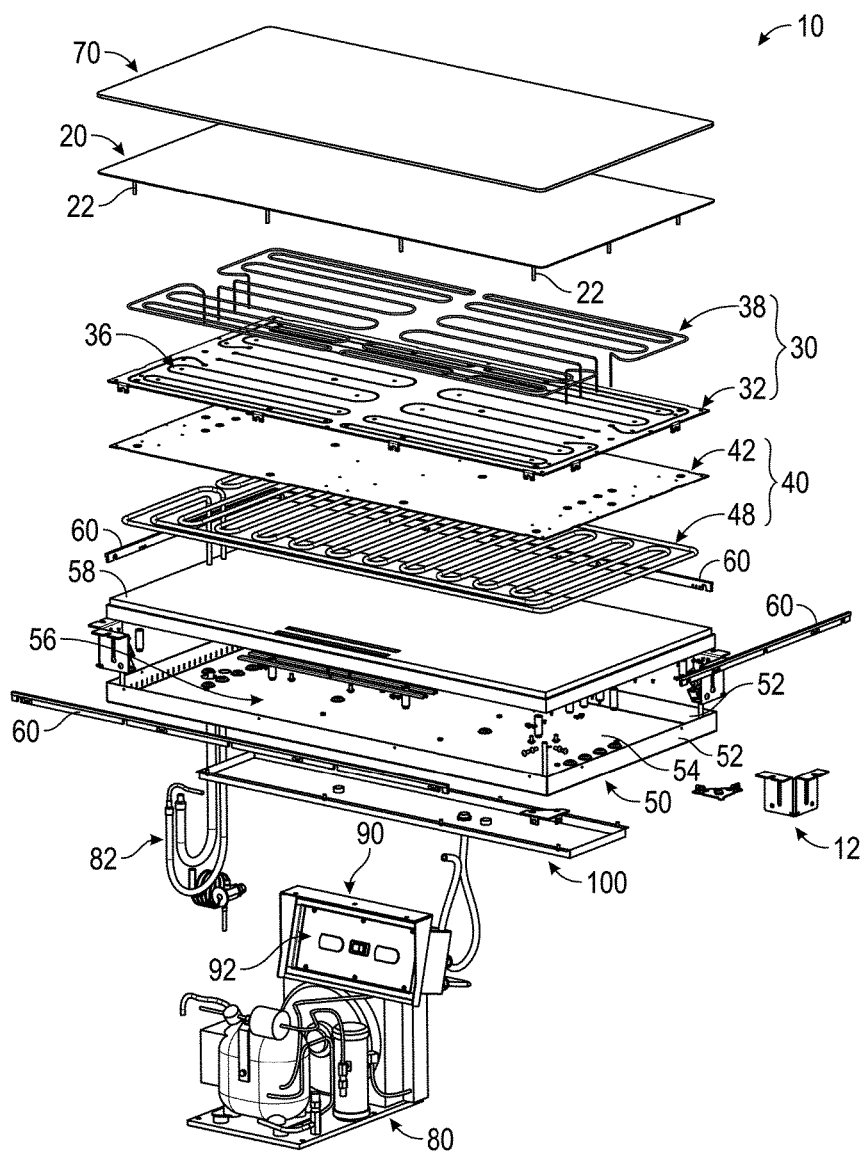
FIG. 1 is an exploded perspective view of a heating and cooling unit, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a heating and cooling unit is arranged in a stacked configuration with a heating assembly between a panel and a cooling assembly and an enclosure surrounding the heating and cooling assemblies. The heating and cooling unit is configured to both heat the panel as part of a heating operation via the heating assembly and cool the panel as part of a cooling operation via the cooling assembly. The heating and cooling unit may be used to at least one of heat (e.g., keep warm, cook, etc.) and cool (e.g., keep cold, reduce the temperature of, etc.) one or more food products or other items. The heating assembly includes a heating element and a heating plate. The heating plate defines slots that receive the heating element, and the heating element may be in direct contact with sidewalls of the slots. Both the heating element and the heating plate are in contact with the panel such that thermal energy may be transferred from the heating element into the panel both directly (e.g., via the heating element, etc.) and indirectly (e.g., via the heating plate, etc.), according to an exemplary embodiment. The direct and indirect heat transfer increases the overall thermal efficiency of the heating operation. Direct contact between the cooling assembly and the heating plate of the heating assembly may increase the thermal efficiency of the cooling process. Thermal breaks may be positioned to thermally-isolate certain components (e.g., the enclosure, a bracket, etc.) of the heating and cooling unit from the panel. During both the heating and cooling operations, the thermally-isolated components (e.g., the enclosure, the bracket, etc.) may be substantially prevented from experiencing a change in temperature (e.g., from becoming too hot, from becoming too cold, etc.) and thereby reduce the risk of condensation forming thereon. Reducing the risk of condensation formation may improve operator satisfaction with the unit and reduces the risk of damaging underlying equipment and surfaces.

According to the exemplary embodiment shown in FIGS. 1-4, a heating and cooling unit, shown as heating and cooling unit 10, includes a panel 20, a heating assembly 30, a cooling assembly 40, and an enclosure 50. The panel 20, the heating assembly 30, the cooling assembly 40, and the enclosure 50 are arranged in a stacked configuration with the heating assembly 30 between the panel 20 and the cooling assembly 40 and the enclosure 50 beneath the cooling assembly 40 (e.g., surrounding the heating assembly 30 and the cooling assembly 40, etc.), according to an exemplary embodiment. The heating assembly 30 is configured to heat the panel 20 as part of a heating operation, while the cooling assembly is configured to cool the panel 20 as part of a cooling operation.

Figure 2:
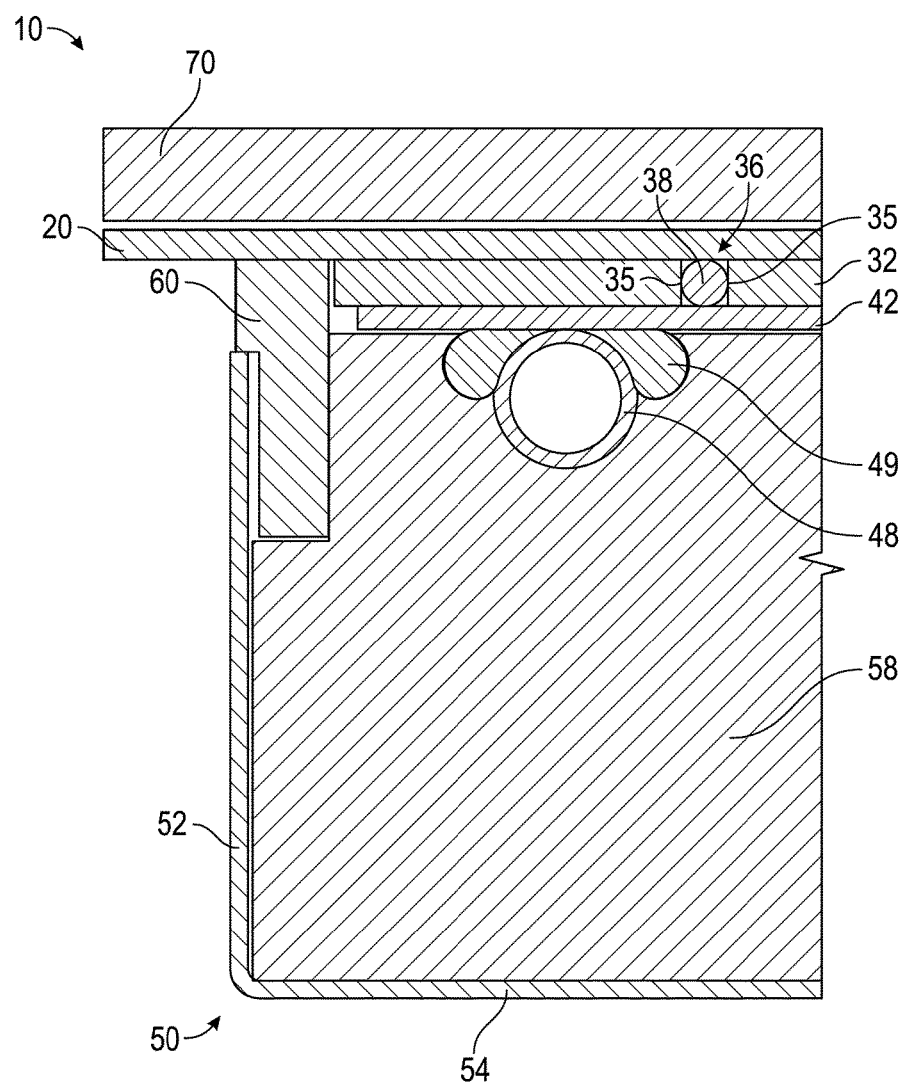
FIG. 2 is a cross-sectional detail view of the heating and cooling unit of FIG. 1, according to an exemplary embodiment.

According to an exemplary embodiment, the panel 20 provides a surface upon which an item (e.g., food product, drink, etc.) is at least one of heated during the heating operation and cooled during the cooling operation. As shown in FIGS. 1-2, the panel 20 is substantially rectangular in shape. In other embodiments, the panel 20 has a different shape (e.g., square, circular, hexagonal, etc.). As shown in FIGS. 1-2, the panel 20 is substantially flat. In other embodiments, the panel 20 is not flat (e.g., curved, etc.). By way of example, the panel 20 may include one or more depressions (e.g., grooves, indents, valleys, etc.) positioned along the surface of the panel 20. The depressions may allow a user (e.g., chef, cook, staff, owner, etc.) to separate or arrange various items (e.g., hot and cold items, solid and liquid items, align sandwiches or ice cream bars, etc.). For example, one depression may receive a liquid based food product (e.g., soup, etc.) and another depression may receive a solid based food product (e.g., sandwiches, pasta, etc.). In one embodiment, one depression and/or section of the panel 20 is heated while another depression and/or section is cooled. In other embodiments, the entire panel 20 is selectively heated or cooled. As shown in FIG. 1, a plurality of fasteners (e.g., threaded rods, bolts, screws, etc.), shown as fasteners 22, are positioned around the perimeter of the panel 20. The fasteners 22 may be used to secure the panel 20 to the other components of the heating and cooling unit 10.

As shown in FIGS. 1-4, the heating assembly 30 includes a first plate, shown as heating plate 32, and a heating element, shown as heating element 38. The heating plate 32 includes a body, shown as heating plate body 34, that defines internal sidewalls, shown as sidewalls 35. The sidewalls 35 form at least a portion of a slot (e.g., channel, cavity, etc.), shown as slot 36, in the heating plate body 34 of the heating plate 32, according to an exemplary embodiment. In one embodiment, the slot 36 has a width sized to receive the heating element 38. The slot 36 may extend entirely or partially through the heating plate 32. In one embodiment, the heating element 38 is pressed into the slot 36 such that the heating element 38 is disposed within the slot 36 and is in contact with the sidewalls 35 of the heating plate 32. The heating element 38 may be flush with an outer surface of the heating plate 32 or may protrude from the heating plate 32 (e.g., before the panel 20 is installed, etc.). In another embodiment, the heating element 38 is laid within the slot 36 and attached to the heating plate 32 via a thermally-conductive adhesive (e.g., Thermally Conductive Epoxy Adhesive TC-2707 or TC-2810 manufactured by 3M, Thermally Conductive Adhesive SE4420, SE4422, SE4400, or SE4450 manufactured by Dow Corning, etc.). According to the exemplary embodiment shown in FIGS. 1 and 3, the heating plate 32 is substantially rectangular. In other embodiments, the heating plate 32 has another shape (e.g., square, circular, hexagonal, etc.).

Figure 3:
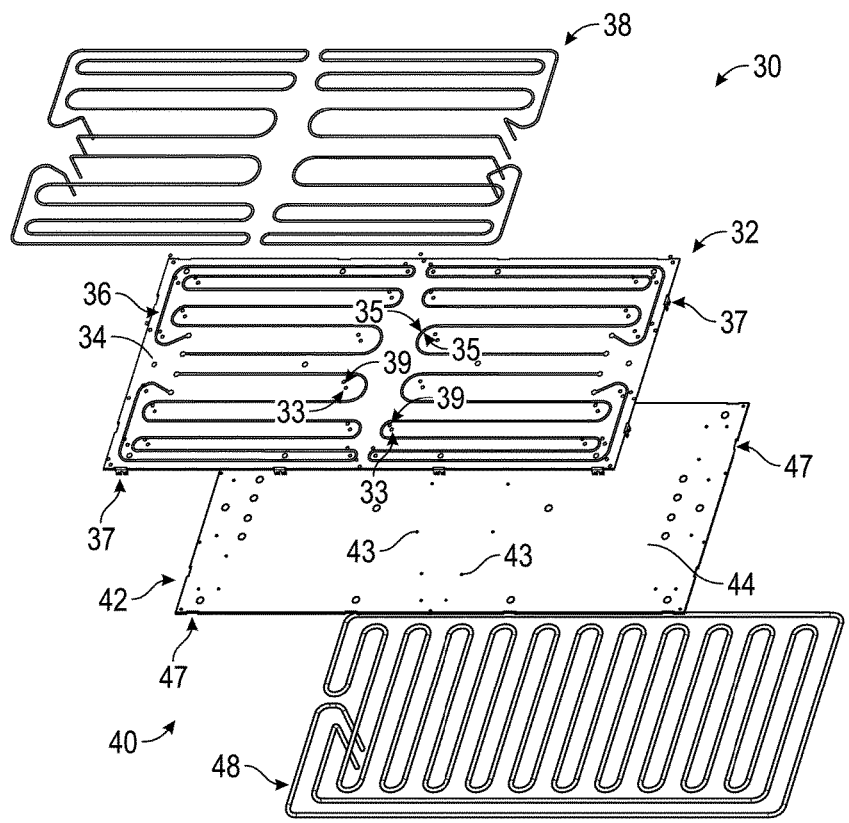
FIG. 3 is an exploded perspective view of a heating assembly and a cooling assembly, according to an exemplary embodiment.

As shown in FIG. 3, the heating plate 32 includes four slots 36 that receive four heating elements 38. In another embodiment, the heating plate body 34 defines a single, continuous slot 36 that receives one heating element 38. In a further embodiment, the heating plate body 34 defines a plurality of slots 36 (e.g., two slots, three slots, five slots, etc.) that receive a corresponding number of heating elements 38. In some embodiments, the heating plate body 34 does not include the slot 36 (e.g., the heating plate 32 is flat with no sidewalls 35 or slot 36, etc.). By way of example, the heating element 38 may be attached to a surface of the heating plate 32 via a thermally-conductive adhesive (e.g., in the absence of slot 36, etc.). In still another embodiment, at least one of the slots 36 defines a passageway through which a working fluid (e.g., a heated fluid, a cooled fluid, etc.) is provided as part of the heating operation and/or the cooling operation. As shown in FIG. 3, the heating plate 32 includes a plurality of couplings, shown as couplings 37, positioned around the periphery of the heating plate body 34 and defines a plurality of apertures 33 (e.g., holes, cut-outs, openings, etc.). The couplings 37 may be any type of coupling (e.g., latches, clips, clasps, etc.) and couple the heating assembly 30 to the cooling assembly 40.

According to an exemplary embodiment, the heating element 38 includes a rope-type resistive heating element used to perform at least a portion of the heating operation of the heating assembly 30. The heating element 38 may be flexible and adaptable to any configuration (e.g., shape, layout, etc.) of the slot 36. The rope-type resistive heating element may receive electrical current (i.e., electrical energy, etc.) that is passed through the element to generate heat (e.g., thermal energy, etc.). In other embodiments, the heating element 38 includes a different type of heating element (e.g., coiled, tubular, non-flexible, etc.). The heating element 38 receives a heated working fluid as part of the heating operation, according to an alternative embodiment.

As shown in FIGS. 1-4, the cooling assembly 40 includes a second plate, shown as cooling plate 42, and a cooling element, shown as cooling element 48. The cooling plate 42 includes a body, shown as cooling plate body 44. In one embodiment, the cooling plate 42 and the panel 20 are manufactured from a metallic material (e.g., aluminum, etc.). Positioning the heating element 38 between two aluminum plates (e.g., in a sandwiched configuration, etc.) may efficiently heat a food product disposed along or on top of panel 20. Firmly holding the heating element 38 within the slot 36 may further improve the efficiency with which the heating and cooling unit 10 heats the food product. According to the exemplary embodiment shown in FIGS. 1 and 3, the cooling plate 42 is substantially rectangular in shape and substantially corresponds with the shape of the heating plate 32. In other embodiments, the cooling plate 42 has another shape (e.g., square, circular, hexagonal, etc.) and may or may not correspond with the shape of the heating plate 32. As shown in FIG. 3, the cooling plate 42 defines a plurality of interfaces, shown as interfaces 47, along the periphery of the cooling plate body 44. The interfaces 47 may be positioned to align with the couplings 37 of the heating plate 32. As shown in FIG. 3, the cooling plate 42 includes a plurality of apertures 43 (e.g., holes, cut-outs, openings, etc.) positioned to align with the apertures 33 of the heating plate 32. Apertures 33 and apertures 43 may receive fasteners to facilitate assembling heating and cooling unit 10.

As shown in FIG. 2, the cooling element 48 is coupled to an underside (e.g., a bottom surface, a surface opposite the heating plate 32, etc.) of the cooling plate 42. According to the exemplary embodiment shown in FIG. 2, the cooling element 48 is attached to the underside of the cooling plate 42 with a thermally-conductive adhesive, shown as thermally-conductive adhesive 49. In other embodiments, the cooling plate body 44 of the cooling plate 42 defines sidewalls that form at least a portion of a slot (e.g., channel, cavity, similar to the slot 36, etc.) in the cooling plate 42. The cooling element 48 may be disposed within the slot (e.g., pressed into the slot, etc.).

According to an exemplary embodiment, the cooling element 48 forms a refrigerant coil that is used in a refrigeration cycle to perform the cooling operation of the cooling assembly 40. By way of example, a refrigerant coil may be used along with a working fluid (e.g., a refrigerant such as R-134a, etc.) in a refrigeration cycle. The working fluid flows through the refrigerant coil and absorbs thermal energy (e.g., evaporation, etc.) from a surrounding environment and the panel 20, reducing the temperature thereof. The absorbed thermal energy (e.g., heat, etc.) is rejected into the surrounding environment (e.g., cabinet, room, air, etc.) through the remaining steps in the refrigeration cycle (e.g., compression, condensation, expansion, etc.). In other embodiments, the cooling element 48 includes another type of cooling element (e.g., thermoelectric cooler, etc.). As shown in FIG. 3, the cooling element 48 is a single, continuous element. In other embodiments, the cooling element 48 includes a plurality of elements (e.g., two, three, five, etc.) that are coupled in series or in parallel.

As shown in FIG. 1, the enclosure 50 includes a plurality of sidewalls 52 coupled to a base plate 54. The base plate 54 and the sidewalls 52 of the enclosure 50 define a cavity, shown as enclosure cavity 56. The enclosure cavity 56 receives insulation, shown as insulation 58. As shown in FIG. 2, the insulation 58 is disposed between the base plate 54 and the cooling element 48. The insulation 58 is positioned to thermally isolate the enclosure 50 during both the heating operation performed by the heating assembly 30 and the cooling operation performed by the cooling assembly 40.

Figure 4:
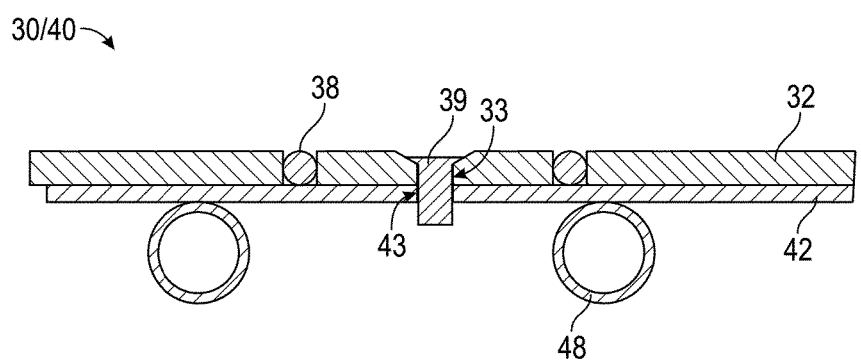
FIG. 4 is a cross-sectional detail view of the heating assembly and cooling assembly of FIG. 3, according to an exemplary embodiment.

According to the exemplary embodiment shown in FIGS. 2 and 4, components of the heating and cooling unit 10 are arranged in a stacked configuration. As shown in FIG. 1-2, the heating plate 32 of the heating assembly 30 is disposed along an underside (e.g., bottom surface, etc.) of the panel 20. In this arrangement, thermal energy may flow from the heating element 38 at least one of directly and indirectly into the panel 20. As shown in FIG. 2, the heating element 38 is in direct contact with the panel 20 such that thermal energy flows directly from the heating element 38 into the panel 20 during the heating operation, increasing the temperature of the panel 20. In other embodiments, the heating element 38 is not in direct contact with the panel 20. As shown in FIG. 2, the heating element 38 is in contact with the sidewalls 35 of the heating plate 32 such that thermal energy flows from the heating element 38 into the heating plate 32 during the heating operation. In other embodiments, the heating element 38 is not in contact with the sidewalls 35 (e.g., there is a gap between the heating element 38 and the sidewalls 35, etc.). As shown in FIG. 2, the heating plate 32 and the panel 20 are in contact such that the thermal energy transferred to the heating plate 32 from the heating element 38 flows into the panel 20. The heating element 38 may thereby indirectly transfer thermal energy into the panel 20 during the heating operation. The overall efficiency of the heating operation is increased (e.g., optimized, maximized, etc.) by transferring the thermal energy both directly and indirectly from the heating element 38 to the panel 20.

According to an exemplary embodiment, the cooling assembly 40 is coupled to the heating assembly 30. As shown in FIGS. 2 and 4, the cooling element 48 is attached (e.g., via the thermally-conductive adhesive 49, etc.) along a surface of the cooling plate 42 opposite the heating assembly 30, and the cooling plate 42 is coupled to the heating plate 32 along a surface opposite the panel 20. According to an exemplary embodiment, an interaction between the couplings 37 along the periphery of the heating plate body 34 and the corresponding interfaces 47 along the periphery of the cooling plate body 44 couple heating plate 32 and cooling plate 42. The corresponding apertures (e.g., apertures 33 and apertures 43, etc.) of the heating plate 32 and the cooling plate 42 may align, and a plurality of fasteners (e.g., rivets, bolts, screws, nails, etc.), shown as fasteners 39, may be received by the apertures 33 and the apertures 43 to secure the heating plate 32 to the cooling plate 42. Thermal energy may be removed from the panel 20 during the cooling operation, reducing the temperature (e.g., cooling, etc.) of the panel 20. In other embodiments, the heating and cooling unit 10 does not include cooling plate 42. By way of example, the cooling element 48 may be directly coupled (e.g., attached, etc.) to the heating plate 32 (e.g., with a thermally-conductive adhesive, etc.).

As shown in FIG. 2, the enclosure 50 receives the insulation 58, and the heating assembly 30, the cooling assembly 40, and the insulation 58 are sandwiched between the panel 20 and the enclosure 50. According to an exemplary embodiment, the fasteners 22 of the panel 20 are received by a plurality of apertures positioned around the perimeter of the enclosure 50. The panel 20 may be secured using a plurality of couplings (e.g., nuts, etc.) such that the components (e.g., the panel 20, the heating assembly 30, the cooling assembly 40, the enclosure 50, etc.) of the heating and cooling unit 10 are held in the stacked configuration.

As shown in FIG. 2, a thermal break, shown as internal thermal break 60, is disposed between the panel 20 and the enclosure 50. In one embodiment, the internal thermal break 60 includes a thermally-resistive material (e.g., a material that does not conduct thermal energy, a material that has a low thermal conductivity relative to the material of heating plate 32 and/or cooling plate 42, polypropylene, fiberglass, P.E.T., PVC, silicone rubber, a polyurethane or other foam, etc.). The internal thermal break 60 is positioned to thermally isolate the enclosure 50 from the panel 20. By way of example, during both the heating and cooling operations, the thermally-isolated enclosure 50 may be substantially prevented from experiencing a change in temperature (e.g., from becoming substantially hot, from becoming substantially cold, etc.), thereby reducing the risk of condensation forming thereon.

According to the embodiment shown in FIGS. 1-2, the heating and cooling unit 10 includes a slab 70. As shown in FIG. 2, the slab 70 is disposed along a surface (e.g., a top surface, etc.) of the panel 20 opposite the heating assembly 30. According to an exemplary embodiment, the slab 70 is attached to the panel 20 via a thermally-conductive adhesive. In one embodiment, the slab 70 has a shape substantially similar to the panel 20. In other embodiments, the slab 70 is larger or smaller (e.g., have a greater surface area, etc.) than the panel 20. By way of example, the slab 70 may be a portion of a kitchen countertop. The slab 70 may include at least one of granite, quartz, marble, slate, and soapstone. The slab 70 may have a substantially high heat capacity such that, once a desired (e.g., target, etc.) operating temperature is reached, a reduced energy input is required to maintain the operating temperature.

According to an exemplary embodiment, the slab 70 provides a surface upon which an item (e.g., food product, drink, etc.) is at least one of heated during the heating operation and cooled during the cooling operation. As shown in FIGS. 1-2, the slab 70 is substantially rectangular in shape. In other embodiments, the slab 70 has a different shape (e.g., square, circular, hexagonal, etc.). As shown in FIGS. 1-2, the slab 70 is also substantially flat. In other embodiments, the slab 70 is not flat (e.g., curved, etc.). By way of example, the slab 70 may include one or more depressions (e.g., grooves, indents, valleys, etc.) positioned along the surface of the slab 70. The depressions may allow a user (e.g., chef, cook, staff, owner, etc.) to separate or arrange various items (e.g., hot and cold items, solid and liquid items, etc.). In one embodiment, one depression and/or section of the slab 70 is heated while another depression and/or section may be cooled. In another embodiment, the entire slab 70 is selectively heated or cooled. In other embodiments, the slab 70 is omitted and the panel 20 is used as the heating and cooling surface upon which food products may be positioned.

As shown in FIG. 1, the heating and cooling unit 10 further includes a refrigeration assembly 80, a control unit 90, and a wiring panel 100. The refrigeration assembly 80 is connected to the cooling element 48 with flexible tubing 82. A working fluid may flow through the cooling element 48, through the flexible tubing 82, into the refrigeration assembly 80, and back into the cooling element 48. A refrigeration cycle may thereby be performed by the cooling element 48 and the refrigeration assembly 80. The wiring panel 100 may store and provide a passageway for wires that facilitate cooperation of the components of the heating and cooling unit 10 (e.g., the heating assembly 30, the cooling assembly 40, etc.) and the control unit 90.

According to an exemplary embodiment, the control unit 90 is configured to allow a user to control the heating and cooling unit 10 via an input/output (I/O) device, shown as a control panel 92. The control unit 90 is communicably coupled to various components of the heating and cooling unit 10 (e.g., the heating assembly 30, the cooling assembly 40, etc.), such that information or signals (e.g., command signals, etc.) may be provided to or from the control unit 90. The information or signals may relate to one or more components of the heating and cooling unit 10. According to an exemplary embodiment, the control panel 92 enables an operator (e.g., cook, chef, staff member, etc.) of the heating and cooling unit 10 to communicate with one or more components of the heating and cooling unit 10. By way of example, the control panel 92 may include at least one of an interactive display, a touchscreen device, one or more buttons (e.g., a stop button configured to turn the unit off, buttons allowing a user to set a target temperature, etc.), switches, and voice command receivers. In one embodiment, the control unit 90 includes a notification device (e.g., alarm, light, display, etc.) that notifies the operator when the target temperature has been reached. In another embodiment, a display shows the current temperature of at least one of the panel 20 and the slab 70, the target temperature, and/or a time until the target temperature is reached.

The heating operation may begin with a flow of electricity provided to the heating element 38. The heating element 38 provides a substantial amount of resistance to the flow of electricity, thereby converting the electrical energy of the electrical flow into thermal energy in the form of heat. As the temperature of the heating element 38 begins to rise, thermal energy may be transferred into both the heating plate 32 and the panel 20 (e.g., directly, indirectly, etc.) through conductive heat transfer. In some embodiments, the heating and cooling unit 10 heats the panel 20 using a different mode of heat transfer (e.g., convection, radiation, etc.). In one embodiment, heating and cooling unit 10 includes the slab 70 such that the thermal energy provided to the panel 20 is transferred into the slab 70. This process may continue until the target heating temperature is reached.

Upon initiation of the cooling operation, the temperature of the panel 20 and/or slab 70 may be substantially greater than the working fluid (e.g., refrigerant, etc.). As the working fluid flows though the cooling element 48, heat from the cooling plate 42, heating assembly 30, panel 20, and slab 70 is transferred into the working fluid, reducing the temperature of the panel 20 and/or slab 70. The working fluid absorbs the heat, which is then released by the refrigeration assembly 80, and the cycle repeats itself until the target cooling temperature is reached.

The heating and cooling unit 10 may be mounted in a variety of arrangements. In one embodiment, the heating and cooling unit 10 rests on top of a surface such as a table, counter, ground surface, or still another surface. In another embodiment, the heating and cooling unit 10 (e.g., without the slab 70, etc.) is mounted underneath a pre-existing surface (e.g., counter, table, etc.), providing a seamless surface. As shown in FIG. 1, the heating and cooling unit 10 includes brackets, shown as mounting brackets 12, for bottom mounting the heating and cooling unit 10.

Figure 5:
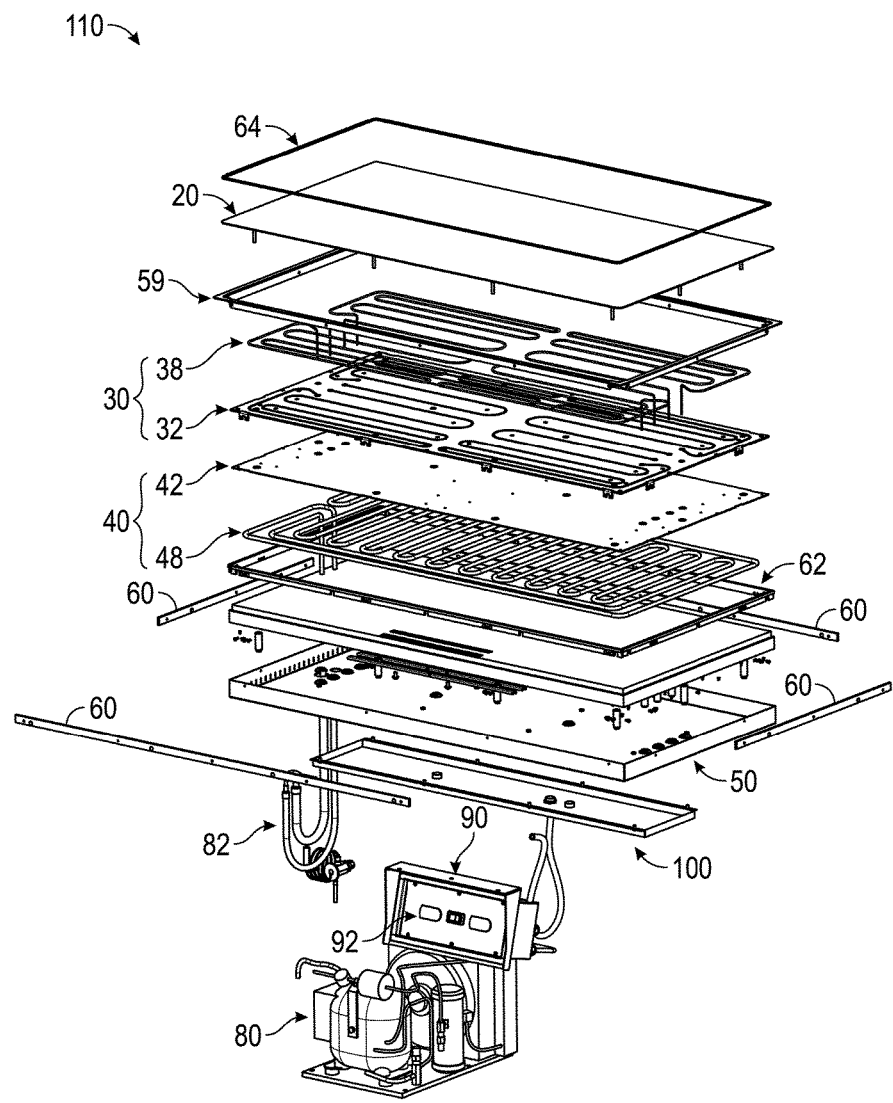
FIG. 5 is an exploded perspective view of a heating and cooling unit, according to an alternative embodiment.
Figure 6:
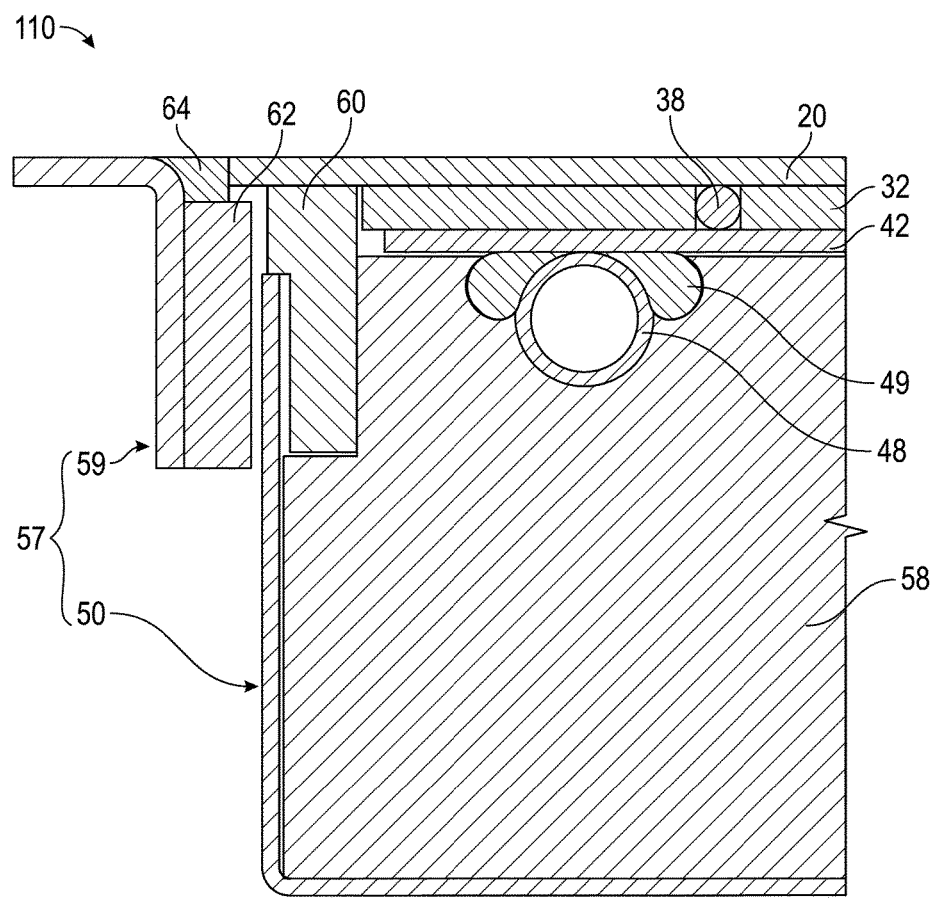
FIG. 6 is a cross-sectional detail view of the heating and cooling unit of FIG. 5, according to an exemplary embodiment.
Figure 7:
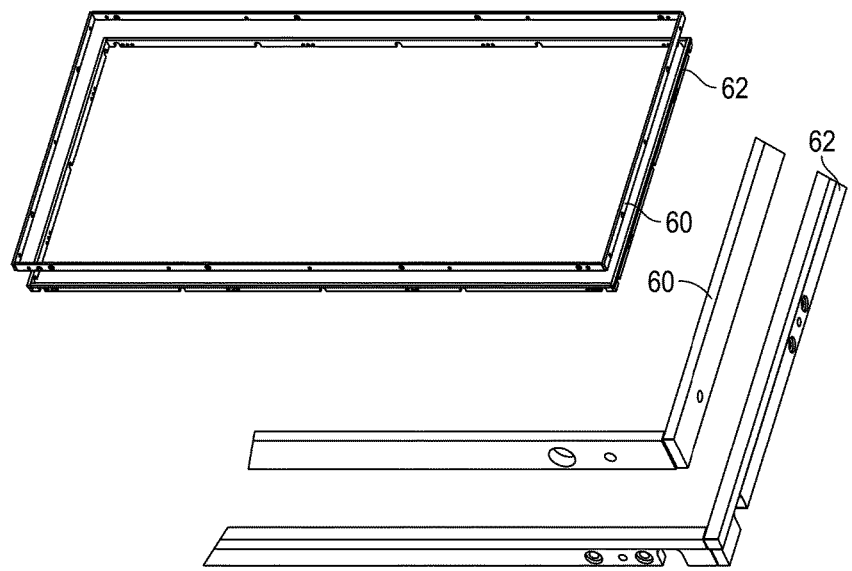
FIG. 7 is a perspective view of a thermal break for a heating and cooling unit, according to an exemplary embodiment.

Referring next to the exemplary embodiment in FIGS. 5-9, a heating and cooling unit, shown as heating and cooling unit 110, includes a panel 20, a heating assembly 30, a cooling assembly 40, a refrigeration assembly 80, and a control unit 90. As shown in FIG. 6, the heating and cooling unit 110 includes a surround, shown as surround 57. As shown in FIGS. 5-7, the heating and cooling unit 110 includes a plurality of thermal beaks including the internal thermal break 60 (e.g., the first thermal break, etc.), a second thermal break, shown as external thermal break 62, and a third thermal break, shown as flexible thermal break 64.

Figure 8:
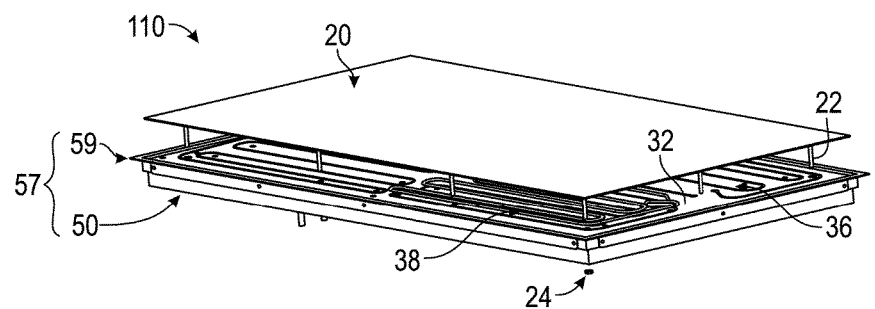
FIG. 8 is a perspective view of a heating and cooling unit, according to an exemplary embodiment.

As shown in FIG. 6, the surround 57 includes the enclosure 50 and a bracket, shown as bezel 59. As shown in FIGS. 6 and 8, the surround 57 extends around a periphery (e.g., perimeter, outside edge, etc.) of the panel 20. In one embodiment, the internal thermal break 60 includes a thermally-resistive material. As shown in FIG. 6, the internal thermal break 60 is disposed between the panel 20 and the enclosure 50. According to an exemplary embodiment, the internal thermal break 60 is positioned to thermally isolate the enclosure 50 from the panel 20 to substantially prevent condensation from forming on the enclosure 50 during the cooling operation. In one embodiment, the external thermal break 62 includes a thermally-resistive material. As shown in FIG. 6, the external thermal break 62 is disposed between the panel 20, the enclosure 50, and the bezel 59. According to an exemplary embodiment, the external thermal break 62 is positioned to thermally isolate the bezel 59 from the panel 20 and the enclosure 50 to substantially prevent the temperature of the bezel 59 from increasing (e.g., during the heating operation, etc.) or the temperature of the bezel 59 from decreasing (e.g., during the cooling operation, etc.) to prevent the formation of condensation on the bezel 59. In one embodiment, the flexible thermal break 64 includes a third thermally-resistive material. As shown in FIG. 6, the flexible thermal break 64 is disposed between the panel 20 and the bezel 59. According to an exemplary embodiment, the flexible thermal break 64 is positioned to thermally isolate the bezel 59 from the panel 20 to substantially prevent the temperature of the bezel 59 from increasing or decreasing (e.g., to prevent condensation from forming on the bezel 59, etc.). In one embodiment, the thermal breaks are made of the same material. In other embodiments, at least one of the thermal breaks is made of a dissimilar material.

The heating and cooling unit 110 may be under-mounted (e.g., mounted underneath a pre-existing surface, etc.) or mounted on top of a pre-existing surface. According to an exemplary embodiment, the bezel 59 facilitates mounting the heating and cooling unit 110 in a recessed configuration within an aperture (e.g., cutout, hole, etc.) in a pre-existing surface such that the enclosure 50 is recessed beneath the pre-existing surface such that portions of the heating and cooling unit 110 are hidden. In one embodiment, the bezel 59 provides a surface that engages the pre-existing surface and suspends the heating and cooling unit 110 in the aperture.

Figure 9:
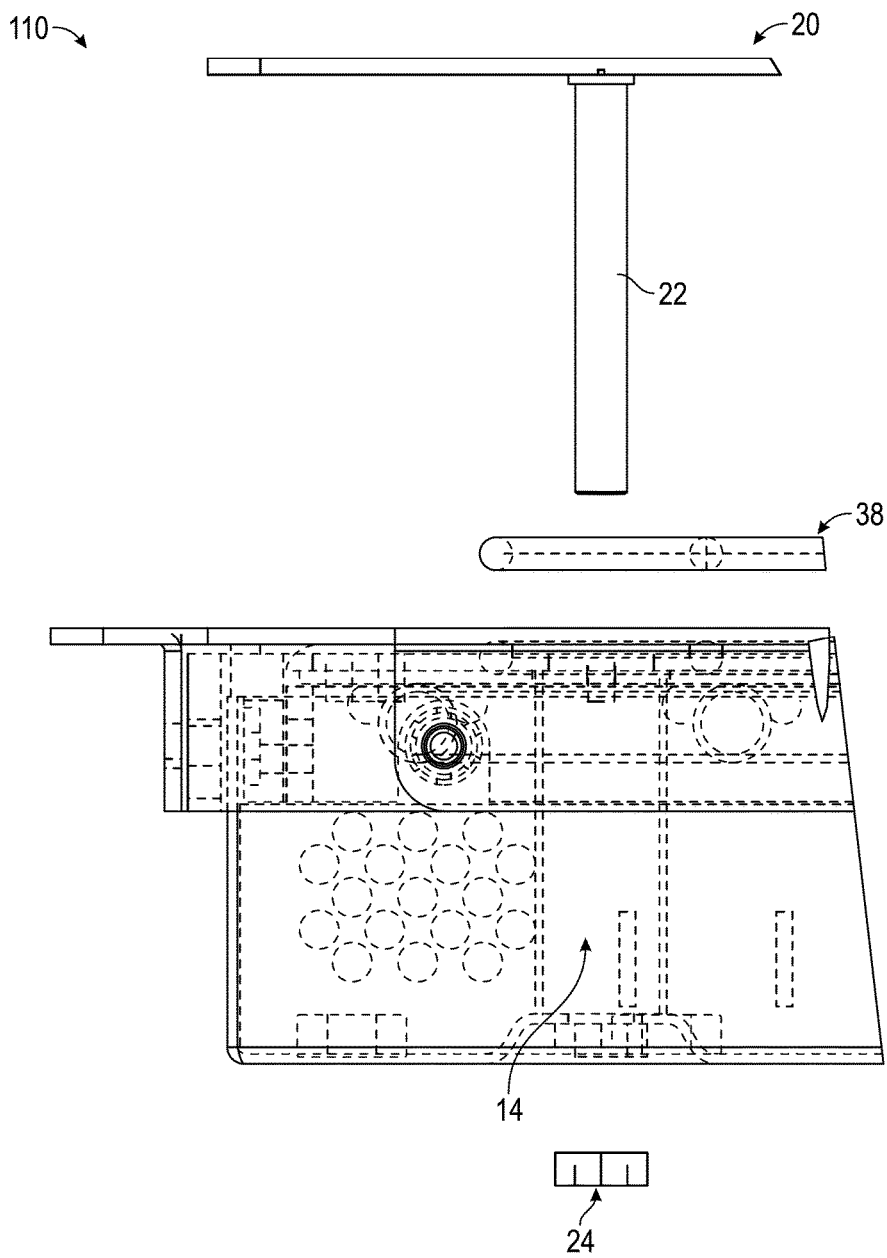
FIG. 9 is a cross-sectional view of the heating and cooling unit of FIG. 8, according to an exemplary embodiment.

According to the exemplary embodiment shown in FIGS. 8-9, the heating element 38 is removable (e.g., replaceable, repairable, to perform maintenance, etc.) from the heating and cooling unit 110. As shown in FIG. 9, the heating and cooling unit 110 defines a plurality of apertures, shown as slots 14, which extend through the entire depth of the unit. The slots 14 align with the fasteners 22 disposed about the periphery of the panel 20. As shown in FIGS. 8-9, the slots 14 are positioned to receive the fasteners 22 such that the panel 20 may be secured to the heating and cooling unit 110 (e.g., the panel 20 abuts the heating plate 32 opposite the cooling plate 42, etc.) with a coupling (e.g., nut, etc.), shown as coupling 24. By way of example, to remove the heating element 38, the couplings 24 may be removed from the fasteners 22, and the panel 20 may be removed from the heating and cooling unit 110. Once the panel 20 is removed, the heating element 38 is exposed and may be removed from the slot 36 of the heating plate 32. The heating element 38 may then be at least one of cleaned, repaired, and replaced. Once the heating element 38 (e.g., a replacement heating element 38, etc.) is returned to the slot 36, the heating and cooling unit 110 may be reassembled. FIGS. 8-9 substantially represent the heating and cooling unit 10 as well. Accordingly, the above described assembly and disassembly may be applied to the heating and cooling unit 10.

Figure 10:
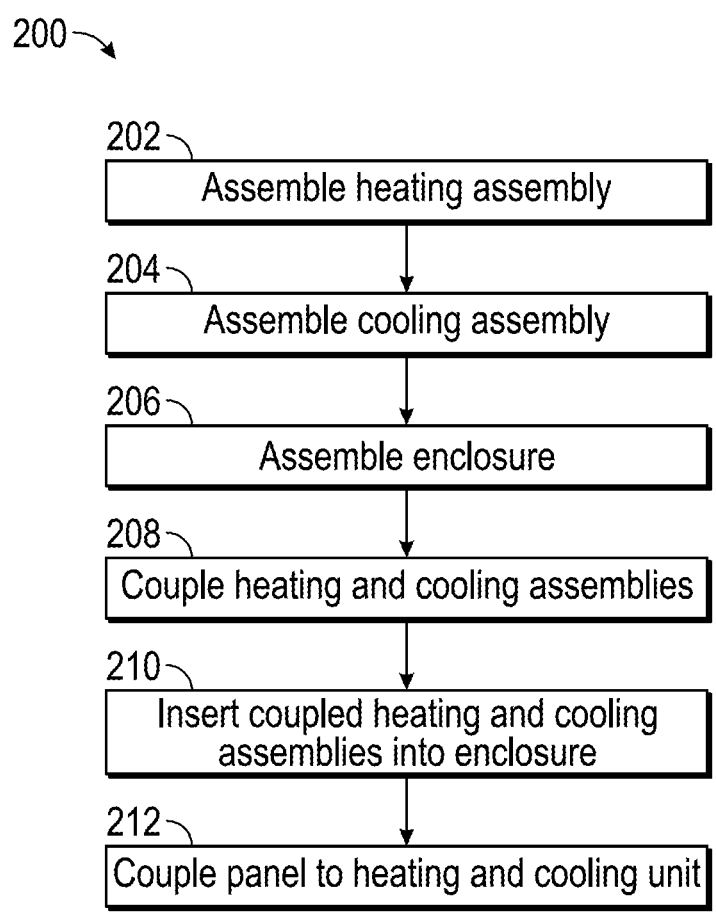
FIG. 10 is a schematic view of a method of manufacturing a heating and cooling unit, according to an exemplary embodiment.

According to the exemplary embodiment shown in FIG. 10, a heating and cooling unit is manufactured according to a method 200. As shown in FIG. 10, method 200 includes assembling a heating assembly (202), assembling a cooling assembly (204), and assembling an enclosure (206). In one embodiment, assembling the heating assembly includes positioning a heating element (e.g., a rope-type resistive heating element, etc.) within a slot defined by a first plate. Assembling the cooling assembly may include attaching a cooling element along a surface of a second plate with a thermally-conductive adhesive. In other embodiments, the cooling assembly does not include a second plate, and assembling the cooling assembly includes attaching the cooling element to a surface of the first plate. The enclosure may include a base plate and sidewalls together defining a cavity that receives various other components of the heating and cooling assembly (e.g., insulation, etc.). As shown in FIG. 10, the method 200 includes coupling the heating and cooling assemblies (208), inserting the coupled heating and cooling assemblies into the enclosure (210), and coupling a panel to the heating and cooling assemblies (212). In one embodiment, coupling the panel to the heating and cooling assemblies includes attaching the panel to the first plate of the heating assembly with a plurality of fasteners and a plurality of couplings. The heating and cooling unit may thereby provide a stacked arrangement of components.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or movable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the elements of the systems and methods as shown in the exemplary embodiments are illustrative only.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A heating and cooling unit, comprising:
a panel manufactured from a thermally conductive metallic material;
a heating assembly configured to heat the panel as part of a heating operation, the heating assembly comprising:
a first plate including a body that defines a slot, wherein the first plate is disposed along a first side of the panel; and
a heating element disposed within the slot; and
a cooling assembly configured to cool the panel as part of a cooling operation, the cooling assembly comprising:
a second plate coupled to the first plate, wherein the second plate is manufactured from a thermally conductive metallic material; and
a cooling element coupled to the second plate,
wherein the panel, the heating assembly, and the cooling assembly are arranged in a stacked configuration with the heating assembly between the panel and the cooling assembly such that the cooling element is positioned to remove thermal energy directly from the second plate, the second plate is positioned to remove thermal energy directly from the first plate, and the first plate is positioned to remove thermal energy directly from the panel during the cooling operation.

2. The unit of claim 1, wherein the heating element includes a rope-type resistive heating element.

3. The unit of claim 2, wherein the cooling element includes a refrigerant coil.

4. The unit of claim 1, wherein the heating element is in direct contact with the panel such that thermal energy flows from the heating element directly into the panel during the heating operation.

5. The unit of claim 4, wherein the body of the first plate defines sidewalls that form at least a portion of the slot, wherein the heating element is in contact with the sidewalls such that thermal energy flows from the heating element indirectly into the panel via the first plate during the heating operation.

6. The unit of claim 5, wherein the second plate has a first surface and an opposing second surface, wherein the cooling element contacts the first surface of the second plate, and wherein the opposing second surface of the second plate contacts the first plate such that thermal energy removed from the panel during the cooling operation flows through an intact portion of the first plate.

7. The unit of claim 6, wherein the cooling element is attached to the first surface of the second plate opposite the first plate with a thermally-conductive adhesive.

8. The unit of claim 1, further comprising a slab of at least one of granite, quartz, marble, slate, and soapstone, wherein the slab is disposed along a surface of the panel opposite the heating assembly.

9. The unit of claim 1, further comprising a thermal break that includes a thermally-resistive material, wherein the thermal break is disposed between the panel and a surround extending around a periphery of the panel.

10. A heating and cooling unit, comprising:
a panel;
a bracket extending along an edge of the panel;
a heating assembly coupled to the panel and configured to heat the panel as part of a heating operation;
a cooling assembly coupled to the panel and configured to cool the panel as part of a cooling operation;
an enclosure coupled to the panel, the enclosure including a base plate and a plurality of sidewalls extending from the base plate that cooperatively define a cavity that receives the heating assembly and the cooling assembly, wherein the panel, the heating assembly, the cooling assembly, and the enclosure are arranged in a stacked configuration with the heating assembly between the panel and the cooling assembly;
insulation disposed between the base plate and the cooling assembly;
a first thermal break including a thermally-resistive material positioned to thermally isolate the enclosure from the panel, the thermally-resistive material including at least one of polypropylene, fiberglass, polyethylene terephthalate, polyvinyl chloride, silicone rubber, polyurethane, and foam, wherein the first thermal break is positioned directly between the panel and the plurality of sidewalls of the enclosure; and
a second thermal break disposed between the panel and the bracket, the second thermal break including a thermally-resistive material positioned to thermally isolate the bracket from the panel.

11. The unit of claim 10, wherein the panel is flat.

12. The unit of claim 10, wherein the heating assembly comprises:
a first plate including a body that defines a slot, wherein the first plate is disposed along a first side of the panel; and
a heating element disposed within the slot, wherein the heating element is in contact with the panel.

13. The unit of claim 12, wherein the cooling assembly comprises:
a second plate coupled to the first plate; and
a cooling element coupled to the second plate, wherein the cooling element is attached to a surface of the second plate opposite the first plate with a thermally-conductive adhesive.

14. The unit of claim 10, further comprising a slab of at least one of granite, quartz, marble, slate, and soapstone, wherein the slab is disposed along a surface of the panel opposite the heating assembly.

15. A heating and cooling unit, comprising:
a panel manufactured from a thermally conductive metallic material;
a heating assembly configured to heat the panel as part of a heating operation, the heating assembly comprising:

a first plate including a body that defines a slot, wherein the first plate is disposed along a first side of the panel; and a heating element disposed within the slot and coupled to the first plate;

a cooling assembly configured to cool the panel as part of a cooling operation, the cooling assembly comprising a cooling element thermally coupled to the first plate;

at least one of an enclosure and a bracket coupled to the panel; and a thermal break including a thermally-resistive material positioned to thermally isolate the at least one of the enclosure and the bracket from the panel;

wherein at least one of:
(i) the cooling assembly further comprises a second plate coupled to the first plate, wherein the cooling element is attached to the second plate directly along a flat exterior surface of the second plate opposite the first plate; and
(ii) the cooling element is attached directly to the first plate along a surface opposite the panel.

16. The unit of claim 15, wherein the heating element and the first plate are in contact with the panel such that thermal energy flows both directly and indirectly from the heating element into the panel during the heating operation.

17. The unit of claim 16, wherein the cooling element is attached to the flat exterior surface of the second plate with a thermally-conductive adhesive.

18. The unit of claim 16, wherein the cooling element is directly attached to the surface of the first plate with a thermally-conductive adhesive.

19. The unit of claim 15, wherein the cooling element is attached directly to the first plate along the surface opposite the panel and the heating element.

20. The unit of claim 15, wherein the thermal break includes a first thermal break and a second thermal break, the first thermal break positioned between the panel and the enclosure, the second thermal break positioned between the bracket and at least one of the panel and the enclosure.

* * * * *